United States Patent [19]

Edwards

[11] Patent Number: 5,345,905
[45] Date of Patent: Sep. 13, 1994

[54] METHOD OF OPERATING A ROTARY INTERNAL COMBUSTION ENGINE

[76] Inventor: Daniel J. Edwards, P.O. Box 2977, Homer, Ak. 99603

[21] Appl. No.: 101,404

[22] Filed: Aug. 3, 1993

Related U.S. Application Data

[60] Division of Ser. No. 32,622, Mar. 17, 1993, Pat. No. 5,261,365, which is a continuation-in-part of Ser. No. 888,018, May 26, 1992, abandoned.

[51] Int. Cl.$^5$ .............................................. F02B 53/02
[52] U.S. Cl. .................................... 123/241; 123/43 R
[58] Field of Search .................... 60/39.6; 123/143 A, 123/43 R, 227, 241

[56] References Cited

U.S. PATENT DOCUMENTS

| | | | |
|---|---|---|---|
| 974,853 | 11/1910 | Bock | 60/39.6 X |
| 1,235,145 | 7/1917 | Kylliainen | 60/39.6 X |
| 4,553,385 | 11/1985 | Lamont | 60/39.6 |

FOREIGN PATENT DOCUMENTS 468610  4/1914  France ................................ 60/39.6

*Primary Examiner*—Michael Koczo
*Attorney, Agent, or Firm*—Richard W. Hanes

[57] ABSTRACT

An internal combustion engine comprising a housing having a peripheral wall with a cylindrical internal surface and side walls defining a chamber, a rotor disposed within said chamber and having a central shaft extending through at least one of the side walls, said rotor having at least one recess in its periphery, at least one pivotally mounted piston disposed in each of said recesses and having a pivotal end and a movable end defining collapsible chambers above and below the piston, a cam track carried on the inside of at least one of the side walls and followers operably interconnecting the cam track and the movable end of the said piston, the improvement which includes an ambient air intake port opening into the peripheral wall of the housing, an exhaust port disposed in the peripheral wall of the housing, at least one combustion chamber disposed in the peripheral wall of the housing, a fuel injector in communication with the combustion chamber and compressed air transfer duets valves and passageways disposed at least in part exteriorly of the engine side walls, establishing fluid communicating between the chamber below the piston and the chamber above the piston.

8 Claims, 4 Drawing Sheets

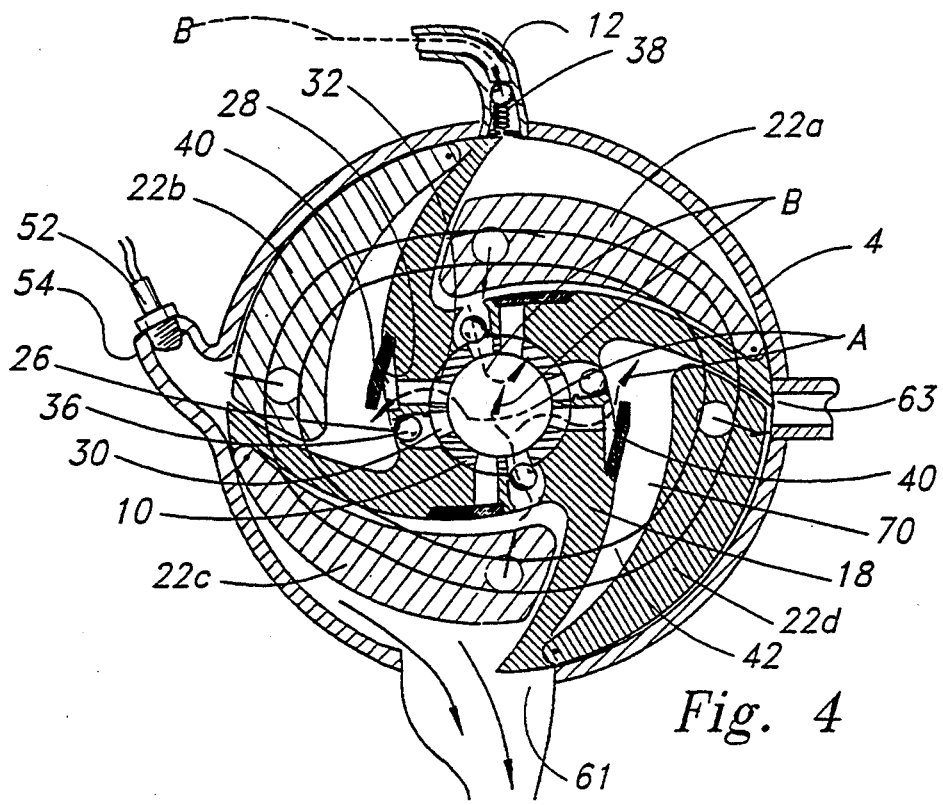
Fig. 4
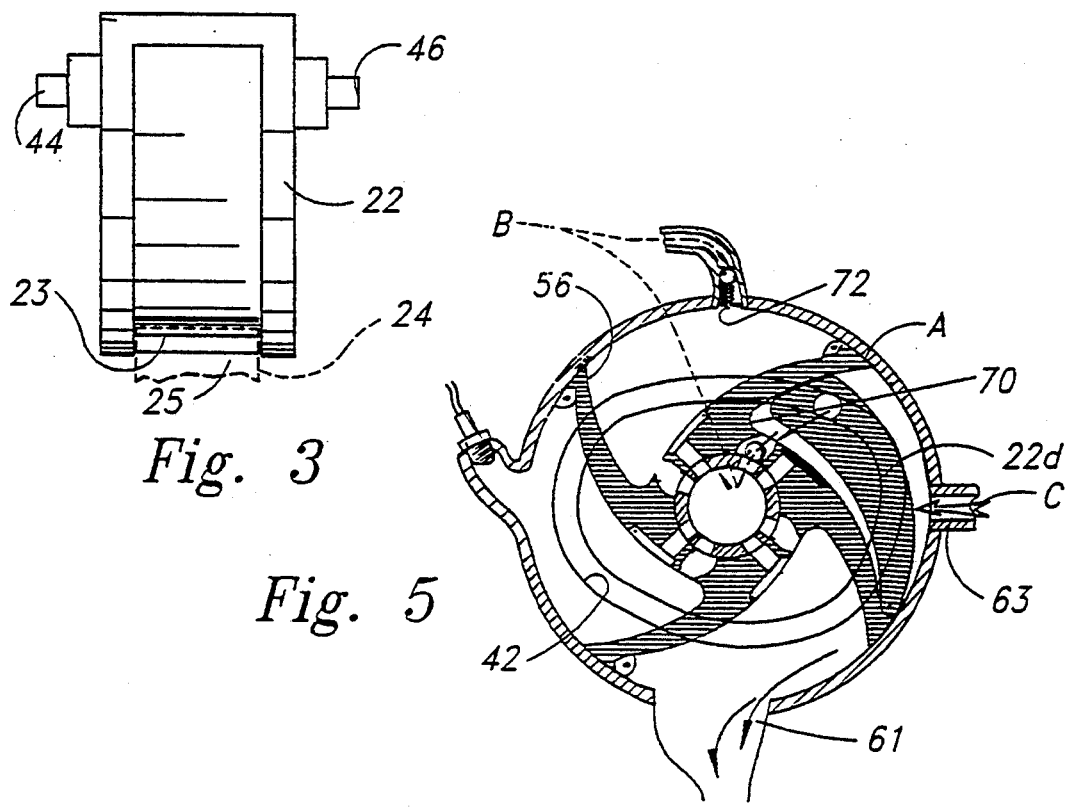
Fig. 3
Fig. 5

METHOD OF OPERATING A ROTARY INTERNAL COMBUSTION ENGINE

This application is a division of application Ser. No. 08/032,622 filed Mar. 17, 1993, U.S. Pat. No. 5,261,365, which is a continuation in part of U.S. application Ser. No. 07/888,018, filed May 26, 1992, abandoned.

The present invention relates generally to internal combustion engines and more specifically to a novel cylindrically shaped rotary engine.

BACKGROUND OF THE INVENTION

Rotary engines with pistons pivotally mounted on a rotating rotor have been in the engine art for some time. See, for example, the U.S. patent to G. E. Hanley, U.S. Pat. No. 1,048,308 and the patent to H. D. Anderson, U.S. Pat. No. 1,400,255. Through the years following, other U.S. patents were issued on improvements and changes to the original rotary concept, the most notable of which was the patent to Felix Wankel, U.S. Pat. No. 2,988,065. Other, less notorious patents on the subject, have issued, including D. N. Blosser U.S. Pat. No. 3,373,723 to D. N. Blosser; U.S. Pat. Nos. 3,438,358; 3,793,998 to M. Yokoi et al; and U.S. Pat. No. 3,855,977 to F. D. Statkus.

The most pertinent prior art from the standpoint of the present invention however is the U.S. patent to Emil Georg Schubert, U.S. Pat. No. 3,789,809. Schubert describes an engine generally similar to the one of the present invention in the disclosure for which he recognizes the advantage of twice compressing the air to be used with the fuel. During only a single downstroke of the pivotal piston, Schubert compresses air beneath the piston and then ducts it to the upper surface of the piston through a channeling system built into the forward end of the recess which houses the piston. One problem with this ducting system for the compressed air is that only a portion of the air compressed below the piston can find its way into the space above the piston during the single stroke of the piston and, accordingly, the engine is only partially supercharged, unlike the present invention. One of the most important distinctions between the engine of Schubert's disclosure and the present invention is the fact that Schubert draws a fuel-air mixture into the space above the piston prior to supplementing the mixture with the compressed air drawn through the channel from below the piston and prior to ignition. This method severely limits the compression ratios which are potentially achievable with an engine of this kind. High compression of a fuel air mixture prior to the programmed time for ignition will cause undesirable pre-ignition and backfiring.

Accordingly, it is the primary object of the present invention to provide a rotary engine which is capable of achieving high compression ratios without the probability of pre-combustion and backfiring.

A second object of the invention is to provide an internal combustion engine where the combustion pressure is exhausted from the combustion chamber, allowing the next injection of fuel to be made into a volume of low pressure, prior to the arrival of the highly compressed air above the piston.

In connection with the preceding object, another object of the invention is to provide a combustion chamber having a shape and disposition relative to the engine housing in which resides an apparent rich fuel-air mixture, pending the arrival of the highly compressed air over the oncoming piston. The result of this objective is to produce an extremely powerful explosion.

Another object of the invention is to provide means, as described in the previous objective, for controlling the richness of the fuel-air mixture by controlling the amount of fuel which is injected into the combustion chamber.

Still another object of the invention is to provide a novel combustion chamber configuration for rotary internal combustion engines which will magnify the tangential force component of the engine, thus producing greater torque and power output from the engine.

A further object of the present invention is to provide a rotary engine having exceptionally good characteristics for purging exhaust gases from the engine.

A still further object of the invention is to provide an engine mechanism which is clean burning and emits the minimum of unburned particulants.

Other objects of the invention will be apparent from a reading of the specification and description of the various embodiments of the invention.

DESCRIPTION OF THE DRAWINGS

FIG. 3 is a top plan view of a piston of the engine of the present invention.

FIG. 4 is an enlarged diagrammatic cross sectional view taken through the engine and showing the relative positions of all of the pistons at a selected point in the rotation of the rotor such as 0°. The valves in the floor of the rotor recess are diagrammatically shown side by side to better illustrate their relative operation, whereas if shown as they appear in the drawing of FIG. 2, a side view of the valves would shown them to be in alignment, that is one behind the other where their simultaneous operation could not be seen. One of the four pistons is illustrated with closely spaced hatch markings to identify it as the piston which will be shown in FIGS. 5–11 and whose particular operation will be followed in the written description of a preferred form of the invention which follows.

FIGS. 5–11 are reduced size but similar cross sectional views to that of FIG. 4 and showing the sequence of operation through one revolution of the engine rotor taken at 45°, 90°, 135°, 160°, 215°, 270° and 315° points of rotor rotation. For clarity, only a single piston is shown as that piston operates during one complete revolution of the rotor. It should be understood that all of the pistons shown in FIG. 4 are present during the revolution of the rotor and they cyclically operate throughout their respective points in the rotation in the same manner as the piston which is shown. The other pistons have been omitted from the diagrammatic illustrations of these figures to simplify the understanding of the operation of the invention.

SUMMARY OF THE INVENTION

The invention comprises improvements in a rotary internal combustion engine which make the engine more efficient and capable of greater torque and power output, size for size, than other rotary engine or any reciprocating engine of the prior art. The improvements include a method and apparatus for double compressing the intake air in the rotary engine prior to induction of the fuel charge in order to greatly expand the compression ratio potential of the engine. While compressing air beneath a pivotal rotary piston is not new, the present invention provides a novel and efficient method of ducting the compressed air from beneath the pistons and around the exterior of the engine into the charge receiving chambers above the pistons as they rotate through a combustion cycle.

DETAILED DESCRIPTION OF THE INVENTION

Figure 1:
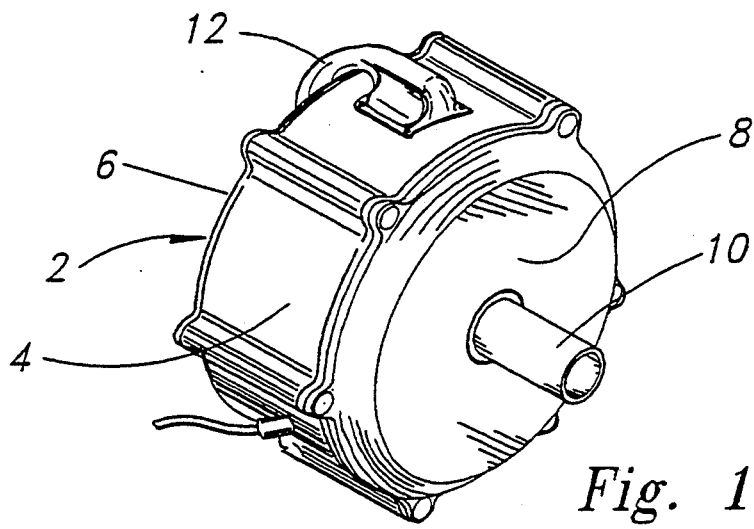
FIG. 1 is a prospective view of the engine of the present invention.
Figure 2:
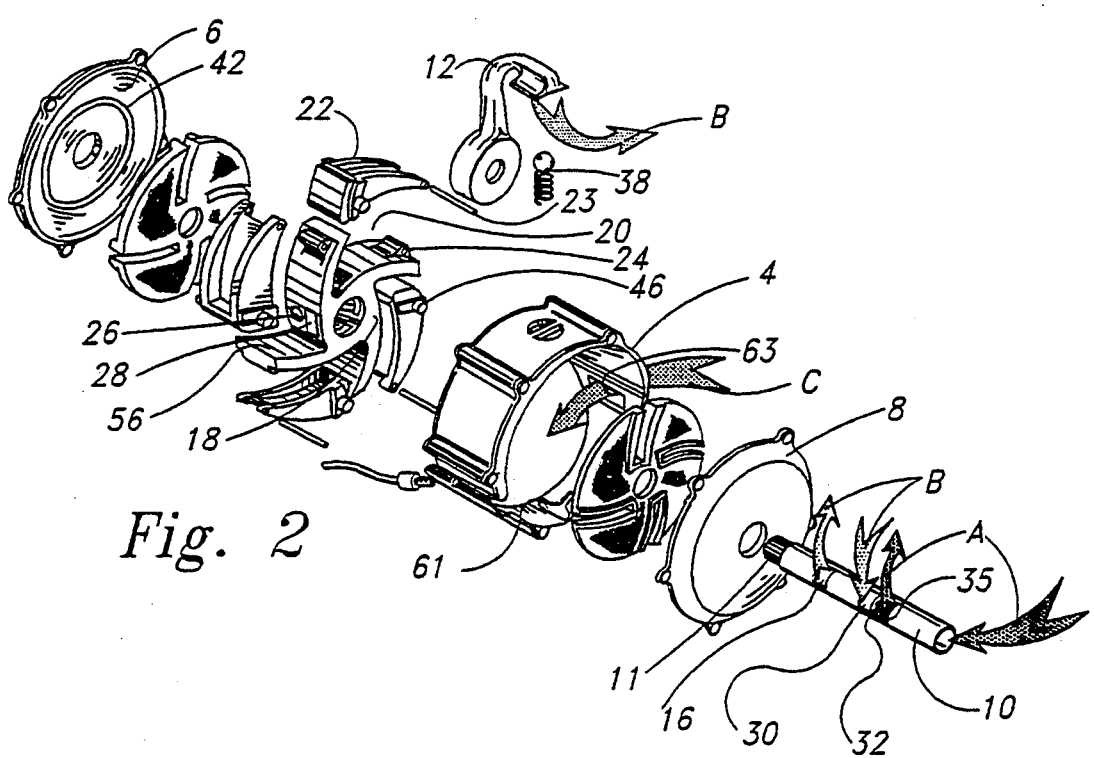
FIG. 2 is an exploded perspective view of the engine. The arrows A, B and C represent different airflows as they are related to specific parts of the engine shown in this figure.

FIG. 1 depicts the assembled rotary engine 2 having a generally cylindrical housing 4 and enclosing side plates 6 and 8 bolted to the housing. A hollow power output shaft 10 emerges from both sides of the motor through central apertures in each of the sides plates, supported by appropriate bearings. The splines 11 on the power take off end of the shaft are shown in FIG. 2. A ducting channel 12 for conveying compressed air B from an opening 16 (FIG. 2) in the output shaft attaches to the periphery of the engine housing 4.

Referring to the exploded view of FIG. 2 of the drawings, a rotor 18 is disposed inside the housing 4 for rotation with the shaft 10. The rotor has a plurality of wedge shaped recesses 20 around its periphery, each of which accommodate a generally similarly shaped and pivotally mounted vane type piston 22. Each of the pistons and their respective mounting recesses are similar to one another in their construction and operation and, accordingly, only a single piston and recess will be described in detail.

A piston 22 is attached to the floor of its respective recess 20 by means of a pin 23 passing through aligned transverse bores in the rearward end of the piston and through a bore in a raised boss 24, integral with the floor of the recess, which boss fits within a notch 25 positioned centrally of the rear edge of the piston. Forward of the boss 24 in the floor of the recess are a pair of openings 26 and 28 which communicate with the shaft receiving bore in the center of the rotor. In the assembled motor, these openings are respectively aligned with openings 30 and 32 in the output shaft 10. A circular plug or transverse partition 35 in the interior of the shaft 10 separates the openings 30 and 32 creating two separate air flow paths.

The first flow path provides for the conduction of first ambient air A to the bottom side of the piston 22. It begins at the open end of the shaft 10, continuing lengthwise of the shaft and exiting through the shaft opening 32, then passing through a reed valve 40 located in the opening 28 in the floor of the rotor recess.

The second path conducts compressed air B and begins beneath the piston 22 and passes through a ball check valve 36 disposed in the opening 26 and hence into the interior of the shaft 10, through the shaft opening 30. The compressed air then passes longitudinally of the shaft interior, exiting through the shaft opening 16 and into the compressed air duct 12 where it then passes through a spring biased ball check valve 38 and into a space inside the housing 4, defined by the top surface of the piston 22, the sides and forward end of the rotor recess 20 and the peripheral inside surface of the housing 4. Appropriate rings and seals are provided around the edges of the piston to maintain a tight seal and isolate the chambers above and below the piston, however such devices are within the skill of the art and will not be described in detail.

Pivotal movement of the piston 22 about its axis of rotation, pin 23, is controlled by the cam-like movement of the piston, as it rotates with the rotor and follows the contour of spaced apart endless loop channels or tracks 42 carried on the inside of the side plates 6 and 8. The piston 22 is provided with laterally extending trunnions 44 and 46 which act as followers by riding in the channels or tracks 42.

During the description of the operation of the motor other, and so far unmentioned, mechanical elements of the combination will be pointed out.

For an understanding of the operation of the novel rotary engine of the present invention, reference is had to the cross sectional views of FIGS. 4-11. The four engine pistons of the illustrated embodiment, are identified with reference numerals 22a, 22b, 22c and 22d.

In general, the rotor 18 and its attached output shaft 10 are driven in rotary motion within the housing 4 by the energy released above the respective pistons 22a-22d by the firing of an explosive mixture of air and fuel at a single point in the circumference of the engine housing 4. Following the teachings of this invention, it would be within the skill of the art to design the engine for clockwise rotation or to provide for more than one firing point around the circumference of the engine or to employ a greater or lesser number of pistons than are shown in the accompanying drawings. An embodiment having a four piston counterclockwise moving rotor with four combustion cycles per rotor revolution will serve as the preferred illustrative example of the means, methods and principals of the invention.

A fuel injection nozzle 52 is connected to a source of pressurized fuel in a manner well known, and not illustrated in the drawings. A single fuel injection nozzle is mounted in the closed end of a hollow bulb or blister 54 disposed on the exterior periphery of the engine housing 4 where its longitudinal axis is angled to the radius of the housing 4 at approximately 45 degrees. The exact angle of the blister may be other than 45 degrees, however it is noted that some angle other than zero degrees from the housing radius is advantageous in order to provide "shape" or direction to the explosive energy of the burning fuel-air mixture and specifically to provide as large as possible tangential component to the force of the energy acting against the forward face 56 of the wedge shaped recess 20 in the rotor. As will become clearer as the description proceeds, the hollow space within the blister 54 together with the space above the forward end of the piston 22 bounded by the inside face of the rotor recess becomes the firing or combustion chamber for the fuel-air mixture.

Following the burning of the fuel-air mixture the exhaust gases are discharged from above the piston through an aperture 61 in the periphery of the engine housing 4, located approximately 90 radial degrees from the fuel injector nozzle 52.

Oxygen for mixing with the fuel is provided from two separate sources and for convenience of reference intake air from the respective two sources will be referred to as first and second ambient air. First ambient air A has already been referred to in connection with the above description of the openings in the shaft 10. Second ambient air C is drawn into the spaces above the pistons 22a-22d through an intake port 63 disposed in the periphery of the housing 4 in a position approximately diametrically opposite to the position of the fuel injection nozzle 52. The supercharging compressed air B, already mentioned as flowing from the opening 16 in the shaft 10, is directed through the exterior ducting channel 12 and into the interior of the housing 4 at a position approximately periphery mid way between the fuel injector nozzle and the intake port 63 for the second ambient air C and diametrically opposite to the exhaust port aperture 61.

Referring now to FIG. 4, and looking first at piston 22d, it is seen that the caming action of the tracks 42 and the track following trunnions 44 and 46 have positioned the piston at its most radially outward or "closed" position where the forward top edge of the piston is just approaching the opening of the intake port and the rearmost end of the piston has just cleared the opening of the exhaust port aperture 61. Inasmuch as the piston 22d is now in its raised or closed position a space exists below the piston and above the floor of the recess 20. Responsive to the low pressure in this "compression chamber" space 70, the reed valve 40 opens, admitting first ambient air A, which is obtained through the first air flow path in the shaft 10, to fill the compression chamber 70 below the piston.

In FIG. 5, the rotor 18 has turned counterclockwise 45 degrees and the piston 22d, following the cam track 42, has moved from a fully closed to a fully open position, creating an air space above the upper surface of the piston which is filled with the second ambient air C passing through the intake port 63. In the process of that downward pivotal movement of the piston 22d, the reed valve 40 is closed and the ball check valve is forced open by virtue of the high air pressure in the compression chamber 70. As the compressed air bleeds from the chamber 70 it follows the already described second air flow path into the duct 12.

Figure 6:
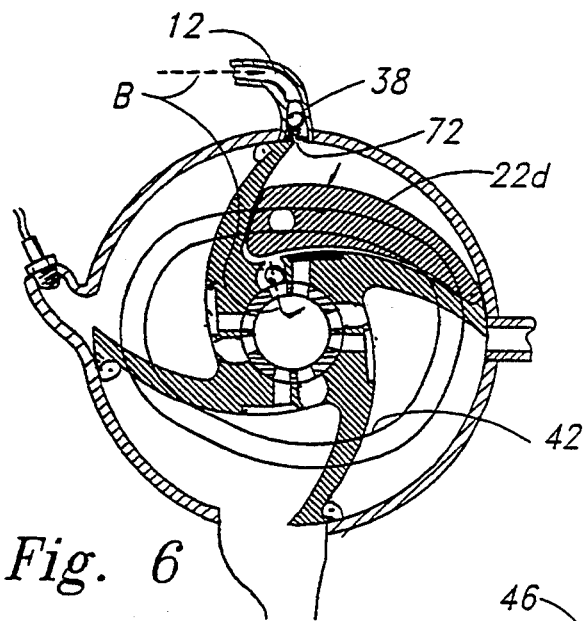

FIG. 6 shows the rotor having turned an additional 45 degrees from the position shown in FIG. 5. The pivotal position of the piston 22d has not substantially changed from that shown in FIG. 5 because the cam track 42 is shaped so as to maintain the piston in the open position during this segment of the rotor rotation. As seen from the drawing, the leading edge of the piston has passed the opening 72 in the periphery of the housing 4, thus exposing the space above the piston to the ingestion of the compressed, or supercharging air B which is present in the duct 12. The admission of the compressed air augments the quantity of second ambient air already present in the space above the piston. The ball check valve 38 at the mouth of the opening 72 acts to admit the high pressure air from the duct 12 into the space above the piston and then closes the opening 72 after the compressed air has been admitted. At this rotor position, the ball check valve 36 beneath the piston is still open due to the residue of compressed air beneath the piston. Once the compressed air has escaped from the chamber beneath the piston, the ball check valve will close under the pressure of a well known type of biasing spring (not shown) or the centrifugal force being exerted on the ball by the rotation of the rotor, or both.

Figure 7:
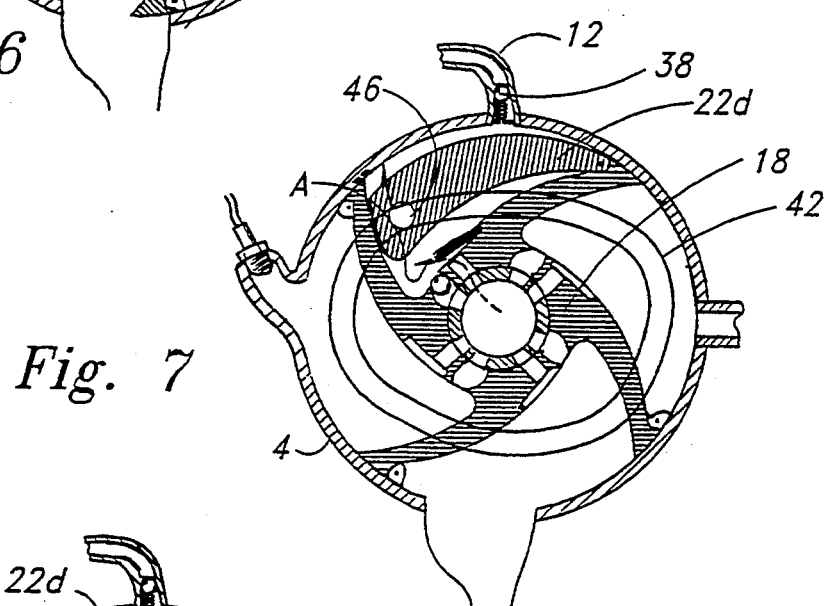

FIG. 7 illustrates the 135 degree rotation position where the piston 22d is beginning its closure movement while the reed valve 40 is opening to begin admitting first ambient air.

Figure 8:
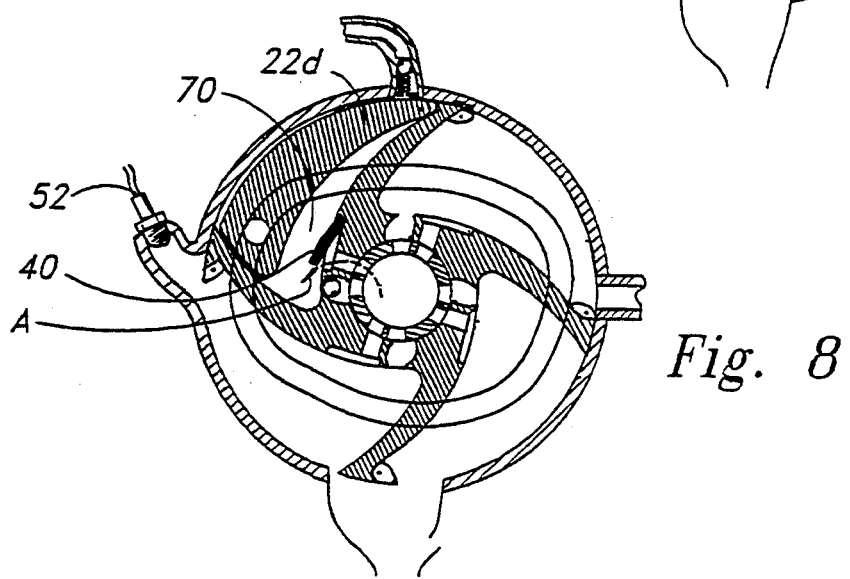

The illustration of FIG. 8 advances the rotor rotation an additional 25 degrees from that shown in FIG. 7, showing the piston 22d approaching half closure as it pivotally responds to the contour of the cam track 42.

As the piston continues its closure movement, the combined portions of the second ambient air C and the compressed air B which fill the charging space above the piston 22d are now being additionally compressed as the volume of the space occupied by these two volumes of air becomes increasingly smaller. Elsewhere, below the piston, the compression chamber 70 continues to inhale first ambient air. As earlier stated, one of the primary objects of the invention is to provide an engine apparatus which is capable of producing very high compression ratios. It is now seen how that is accomplished with a second stage of compression which compresses air that has already undergone a first stage of compression below the piston. Not only does the second stage of compression greatly multiply the possible compression ratios achievable with the engine of the present invention, it is doing so out of the presence of fuel, which has not yet been mixed with the twice compressed air. Without the fuel, as an added component, there is no possibility of undesirable pre-combustion.

For the next and most significant of all of the steps in the combustion cycle, reference is again had to FIG. 4, which becomes illustrative of the next notable position of the piston 22d which this description is particularly following. In FIG. 4 the piston 22d has been pivoted to a closed position and the air above the piston has been very highly compressed with attendant high air temperature. Due to the forward motion of the rotor and the squeezing action of the curved upper surface of the piston as it approaches the inner surface of the housing 4 during its upward movement, the hot compressed air is forced forwardly into the space defined by the interior of the fuel injector mounting blister 54 and the space just above the downwardly sloping leading edge of the piston. Just prior to the time at which the highly compressed air in the chamber above the piston is rotated to a position where it can make contact with the combustion chamber 54, fuel is mechanically or electrically injected in a manner well known, thus introducing a charge of fuel into the charge holding space 54, which becomes the firing or combustion chamber. The appropriate mixture of fuel and highly compressed hot air forms a combustible mixture which spontaneously ignites in an explosion. The force of the explosion drives the piston down in its cam track, producing a turning force on the rotor. At the same time, a large component of the explosive force acts directly against the forward wall of the rotor recess 20 in a tangential direction, driving the rotor forward with an unusually high force moment, that is, the tangential force component multiplied by the distance from the center of the output shaft 10 to the force effective center of the said forward face of the recess. Note should be made of the fact that prior to the detonation of the fuel charge, with the piston completely closed, the compression chamber 70 beneath the piston has been recharged with first ambient air.

Figure 9:
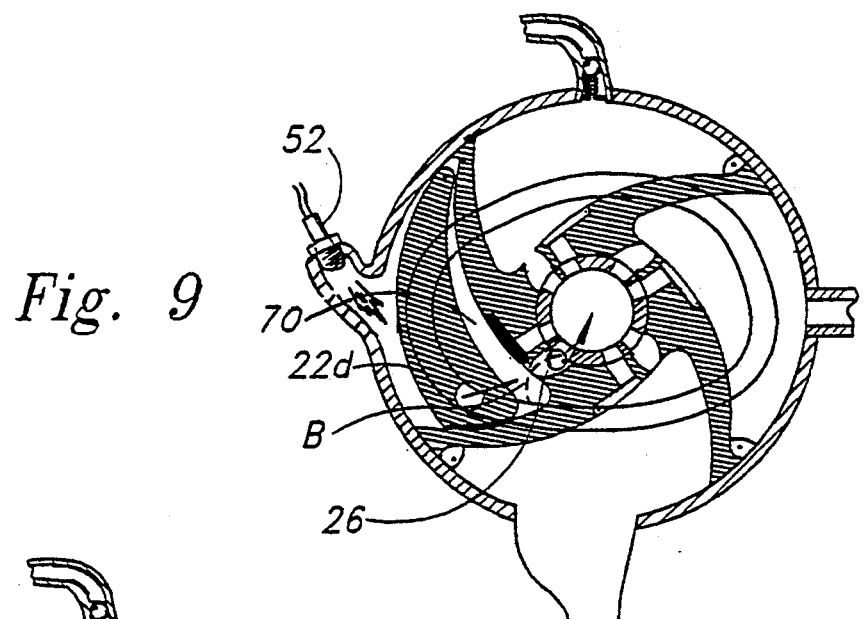

Following once again the rotation of the piston 22d, that piston is seen in FIG. 9 as it descends during the duration of the explosion, compressing the first ambient air in the chamber 70.

Figure 10:
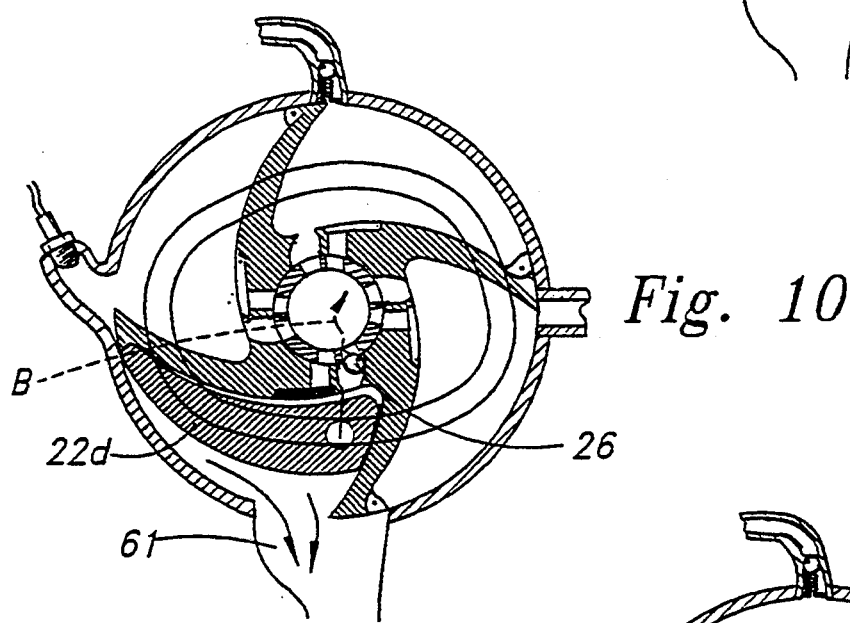

The next sequence is shown in FIG. 10 where the rotor is in the 270 radial degree position in respect of its position as shown in FIG. 4. Following the contour of the cam track 42, the piston 22d has opened to its fullest extent, and as the piston passes the exhaust aperture 61 the burned gases and products of combustion are forced out of the aperture. At this position of the piston 22d, the ball check valve 36 has been forced open by the pressure beneath the piston, allowing the air compressed beneath the descending piston to be conveyed through the shaft 10 and into the compressed air duct 12 where it will be available for ingestion above piston 22b (not shown in FIG. 10 for sake of clarity).

Figure 11:
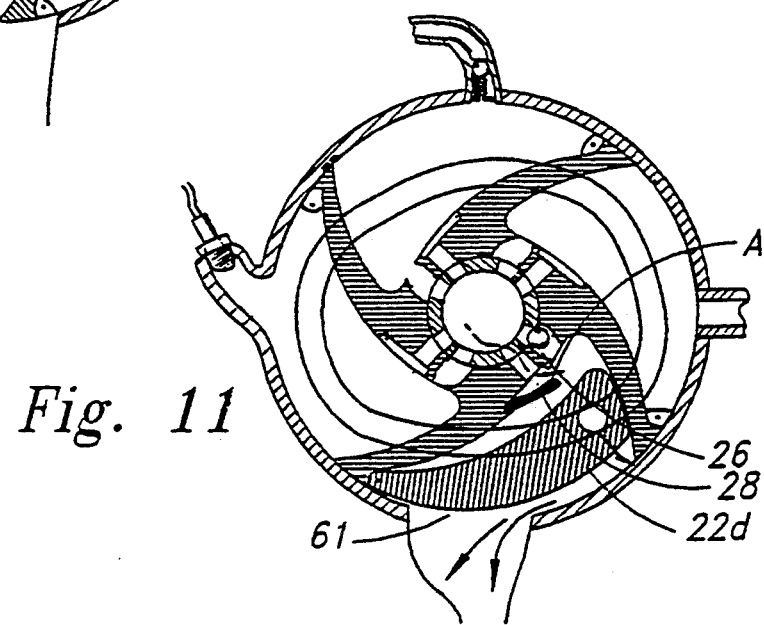

The 315 degree rotation position is illustrated in FIG. 11. In this Figure, piston 22d is in a middle pivot position, as it was shown in FIG. 8 and once again the first ambient air is being inducted beneath the piston while the closing of the piston against the inner periphery of the housing 4 continues to expel the burned gases through the aperture 61.

Returning to FIG. 4 for the next sequence, it is seen that a full combustion cycle of the piston 22d has been traced. By further examination of FIGS. 4–11, it is apparent that all of the pistons function similarly through their respective radial positions to the piston 22d whose combustion cycle through its single rotation has been described. During one revolution of the rotor there are four detonations, as each of the pistons comes under the combustion chamber 54.

Although the detonation process was described in terms of spontaneous combustion, it is well within the scope of this invention to employ glow plugs or spark plugs to achieve the ignition of the fuel-air charge. In this connection it is timely to briefly describe a second embodiment of the fuel charging apparatus. In this embodiment which is not illustrated, at least some of the compressed bleed air from beneath the piston is routed to the fuel injector which then introduces a combination of fuel and compressed air into the interior of the blister or the combustion chamber prior to the arrival of the compressed air above the piston. At the point in time when the compressed air over the piston is placed in contact with the very rich fuel air mixture already present in the combustion blister the charge is fired by a properly timed spark plug. The resulting explosion front progresses down the length of the combustion blister, finally reaching the layer of supercharged air above the piston's top surface. The compressed air layer expands and produces substantial additional power, burning the fuel in the combustion chamber thoroughly and cleanly.

It is apparent from the detailed description of this preferred embodiment of the invention how the objectives of high compression ratios have been achieved by the double and supplemental compression of the intake air. Furthermore, it is now obvious how the increased torque output of the engine is achieved through the arrangement of the engine's parts to effect a substantial tangential force on the radial extremities of the engine's rotor to create an unexpectedly high force moment from the energy generated by each fuel-air detonation.

As evidenced by the embodiment of the invention described in the parent application, there are other arrangements and embodiments of the apparatus of the present invention which will achieve the same results of high torque and high compression ratios, utilizing the principals of double compression, extended length burning time, substantial purging of the exhaust gases and the creation of substantial tangential force components from the firing energy of the engine.

The porting of the intake ambient air and exhaust gasses and the double use and ducting of compressed air through the use of intake and exhaust ports in one or both of the side plates which enclose the engine's rotor within the cylindrical housing were all disclosed in the parent application. The ports were shown in the parent application as being opened and closed by the presence or absence against the ports of the sides of the piston and other portions of the rotor throughout the rotation of the rotor.

While disclosed herein in terms of a rotary engine, it is well within the teaching of this invention to apply this method of operating an internal combustion engine to a traditional two cycle reciprocating engine. Applying the teachings of this invention, compression would take place above and below the piston in the same manner as taught in this specification, thus achieving the advantages of double compression.

I claim:

1. A method of operating an internal combustion engine having a piston movable up and down and having compression chambers above and below the piston, comprising the steps of:

cycling the piston into a first upstroke,
filling the compression chamber below the piston with ambient air during the said first upstroke of the piston and simultaneously removing the products of combustion from the chamber above the piston,
cycling the piston into a first downstroke and compressing the air in the chamber below the piston while simultaneously filling the compression chamber above the piston with ambient air and,
bleeding the compressed air away from the chamber beneath the piston,
inserting the said compressed bleed air into the chamber above the piston,
cycling the piston into a second upstroke where the combination of ambient air and bleed compressed air in the chamber above the piston is further compressed and its temperature is raised while simultaneously filling the chamber below the piston with ambient air,
inserting fuel into the chamber above the piston,
detonating the resulting fuel-air mixture, and
cycling the piston into a second downstroke while simultaneously compressing the air in the chamber beneath the piston.

2. A method of operating a rotary internal combustion engine having at least one orbital and pivotally movable piston and at least one compression chamber in juxtaposition to the piston and a combustion chamber separate from the compression chamber, comprising the steps of;

compressing air in the compression chamber to a temperature sufficient to cause spontaneous combustion when the compressed air is introduced to a combustible fuel,
injecting fuel into the combustion chamber,
mixing the compressed air with the injected fuel to obtain spontaneous combustion of the resulting fuel-air mixture.

3. A method of operating a rotary internal combustion engine having at least one orbital and pivotally movable piston and at least one compression chamber in juxtaposition to the piston and a combustion chamber separate from the compression chamber, comprising the steps of;

compressing air in the compression chamber,
injecting fuel into the combustion chamber,
mixing the compressed air with the injected fuel, and
igniting the mixture of fuel and air at a selected time.

4. A method of operating an internal combustion engine having at least one movable piston and having a first compression chamber below the piston and a second compression chamber above the piston and a combustion chamber separable from the second compression chamber, comprising the steps of:

compressing first air in the first compression chamber, introducing said first compressed air into the second compression chamber, cycling the piston into an upstroke to reduce the volume of the second compression chamber and thus further compressing the first compressed air, injecting fuel into the combustion chamber, and combining the further compressed air with the injected fuel to form a combustible fuel-air mixture.

5. The method of claim 4 and including the further step of detonating the fuel-air mixture at a selected time.

6. The method of claim 4 where the step of further compressing the first compressed air raises the temperature of the further compressed air to a degree sufficient to support spontaneous combustion when the further compressed air is combined with the fuel.

7. A method of operating an internal combustion engine having at least one movable piston and having a first compression chamber below the piston and a second compression chamber above the piston and a combustion chamber separable from the second compression chamber, comprising the steps of:

drawing ambient air into the second compression chamber, compressing first air in the first compression chamber, introducing said first compressed air into the second compression chamber, cycling the piston into an upstroke to reduce the volume of the second compression chamber and thus further compressing the first compressed air, injecting fuel into the combustion chamber, and combining the further compressed air with the injected fuel to form a combustible fuel-air mixture.

8. A method of operating an internal combustion engine having at least one movable piston and having a first compression chamber below the piston and a second compression chamber above the piston and a combustion chamber separable from the second compression chamber, comprising the steps of:

drawing ambient air into the second compression chamber, drawing ambient first air into the first compression chamber, compressing first air in the first compression chamber, introducing said first compressed air into the second compression chamber, cycling the piston into an upstroke to reduce the volume of the second compression chamber and thus further compressing the first compressed air, injecting fuel into the combustion chamber, and combining the further compressed air with the injected fuel to form a combustible fuel-air mixture.

* * * * *